104-97.
4-16-74

AU 116    EX
XR    3,804,058

United States Patent [19]
Messenger

[11] 3,804,058
[45] Apr. 16, 1974

[54] PROCESS OF TREATING A WELL USING A LIGHTWEIGHT CEMENT

[75] Inventor: Joseph U. Messenger, Dallas, Tex.

[73] Assignee: Mobil Oil Corporation, New York City, N.Y.

[22] Filed: May 1, 1972

[21] Appl. No.: 248,905

[52] U.S. Cl.................. 166/292, 166/293, 106/97
[51] Int. Cl............................................ E21b 33/14
[58] Field of Search........ 166/293, 292; 106/86, 96, 106/97, 120

[56] References Cited
UNITED STATES PATENTS
| | | | |
|---|---|---|---|
| 2,985,239 | 5/1961 | Shell | 166/293 |
| 3,669,701 | 6/1972 | Biederman, Jr. | 106/86 X |
| 2,085,793 | 7/1937 | Coss | 106/86 |
| 3,220,863 | 11/1965 | Mayhew | 106/96 |

OTHER PUBLICATIONS
Coffer et al., "A Ten-Pound Cement Slurry for Oil Wells," Petroleum Transactions, AIME, Vol. 201, 1954, pp. 146–148.
Technical Bulletin 14-2-1, "Glass Microballoons IG-101," Emerson & Cuming, Inc., Revised 10/69.
Technical Bulletin 14-2-5, "Eccospheres FA-A," Emerson & Cuming, Inc., 3/71.

*Primary Examiner*—Stephen J. Novosad
*Attorney, Agent, or Firm*—A. L. Gaboriault; Henry L. Ehrlich

[57] ABSTRACT

This specification is directed to a lightweight hydraulic cement, to the use of lightweight slurries formed by combining this lightweight cement with water, and to lightweight concrete formed by the setting of the slurries. The lightweight hydraulic cement is comprised of hydraulic cement, anhydrous sodium metasilicate, and hollow sealed spheres; a lightweight slurry is formed by mixing the lightweight cement with water and the slurry is used for treating wells that penetrate the earth. This lightweight slurry may also be used for forming lightweight concrete which in turn is useful for such things as building material.

6 Claims, No Drawings

PROCESS OF TREATING A WELL USING A LIGHTWEIGHT CEMENT

BACKGROUND OF THE INVENTION

Wells drilled into the earth are conventionally completed by running casing strings thereinto and pumping cement slurries down the interior of the casing strings and into the annulus surrounding the casing strings. The cement slurry is then maintained in place and allowed to set. The set cement serves the purposes of supporting the casing in the well and isolating formations one from the other which have been penetrated by the well.

Where lost circulation is a potential danger it is desirable that the cement slurry which is introduced into the well have about the same density as the drilling mud which is in the well at the time that the cement slurry is introduced thereinto. If the cement slurry density is greater than that of the mud there is imposed by the cement slurry an increased hydrostatic pressure upon the formations penetrated by the well. This increased pressure may break down the formations behind the casing, resulting in the loss of circulation during the cementing job. It is particularly important in cementing a well which has already experienced lost circulation problems to employ a cement slurry having about the same density as the drilling mud in the well.

In the drilling of many wells, drilling muds are employed which have a density of 9 to 11 pounds per gallon. Neat cement slurries which may be employed normally have a density from 14.5 to 17 pounds per gallon. Various lightweight materials have been added to cement slurries to reduce the density thereof. These materials include such things as water, bentonite, diatomaceous earth, volcanic ore that has been expanded (made cellular) by heating to the fusion point, pozzolana, fired clay, ground coal, natural asphalt, and clay bubbles entrapping air. In addition, various lightweight additives have been employed in cements to form lightweight construction materials. These additives include discrete expanded polymeric particles and void-containing particles that have been treated by a water-repellent material.

A lightweight composition of matter suitable for use as a thermal insulating or acoustical material is described in U. S. Pat. No. 2,085,793 to Harold T. Coss. The thermal insulating composition comprises particles or granules containing voids of optimum size, a water-repellent material associated therewith, and a hydraulic binder of the type of calcium aluminate cement adhering the granules and material associated therewith into a unitary product with preservation of voids within the granules.

Another lightweight construction material, more particularly a low density concrete, is described in U. S. Pat. No. 3,272,765 to Robert C. Sefton. This low density concrete is prepared by providing an aggregate of discrete closed cell expanded polymeric particles homogeneously distributed in a cement binder having entrained therein at least 13.5 percent by volume of air. The discrete expanded polymeric particles may be expanded polystyrene, polyethylene, phenol-formaldehyde condensation products, polyvinyl chloride, polyacrylonitrile, polyacrylic esters, polymethacrylic esters, and copolymers of styrene and comonomers such as butadiene or acrylonitrile.

A lightweight additive which has been adapted for use in oil well cements is described in a paper entitled, "A Ten-Pound Cement Slurry for Oil Wells," by H. F. Coffer, J. J. Reynolds, and R. C. Clark, Jr., in TRANSACTIONS, AIME, Vol. 201 (1954), pp. 146–148. This additive consists of small clay bubbles entrapping air.

In addition, hollow sealed spheres made of ceramic and glass have been suggested for use as lightweight additives in cement slurries. These hollow sealed spheres are available from Emerson and Cuming, Inc., Canton, Massachusetts, under the trade names of Eccospheres and Glass Microballoons.

SUMMARY OF THE INVENTION

In accordance with this invention there is provided a lightweight cement which is comprised of hydraulic cement, anhydrous sodium metasilicate, and hollow sealed spheres. This cement may be mixed with water to form a cement slurry which sets to form lightweight concrete.

In accordance with another embodiment, there is provided a process of treating a well penetrating the earth. A pumpable cement slurry comprised of hydraulic cement, anhydrous sodium metasilicate in an amount no greater than 3 weight percent of the cement, hollow sealed spheres in an amount no greater than 70 weight percent of the cement, and water in an amount in excess of 5.0 gallons per 94 pounds of cement. This cement slurry is introduced into the well and allowed to set therein.

DESCRIPTION OF THE PREFERRED EMBODIMENTS

This invention is directed to a lightweight cement and to the use of slurries formed from this lightweight cement. One particular important use of these slurries is in the treating of wells penetrating the earth. The slurries may also be used for forming lightweight concrete which is useful for such things as building materials and masonry.

Lightweight or low density cement slurries are highly desirable for use in treating wells that penetrate the earth. Such lightweight cement slurries make possible the use of longer cement columns than otherwise would be possible without the risk of breaking down the formation and reduce the need for stage cementing. Lightweight additives which have been suggested for use in cement slurries are available from Emerson and Cuming, Inc., Canton, Massachusetts. These lightweight additives are hollow sealed spheres made of ceramic and glass and are available under the trade names of Eccospheres and Glass Microballoons. Eccospheres are hollow sealed spheres made of ceramic and Glass Microballoons are hollow sealed spheres made of sodium borosilicate glass. These hollow sealed spheres which are often referred to as microspheres and microballoons, vary generally within a size range of 10–325 microns in diameter. The composition and physical properties of Eccospheres FA-A and Glass Microballoons IG-101 as determined by Emerson and Cuming, Inc. is given in Table I; the values in parentheses in Table I were determined in tests run by me.

TABLE I.—COMPOSITION AND PROPERTIES OF HOLLOW SEALED SPHERES

| Physical properties | Eccospheres FA-A | Glass microballoons IG-101 |
|---|---|---|
| Composition | (1) | (2) |
| Color | Tan | White |
| Melting point, °F | 1,800 | 900 |
| Bulk density, g./cc. | 0.4 | (0.154) |
| Bulk density, lb./cu. ft. | 25.0 | 12-15 |
| Absolute density, g./cc. | 0.6 | 0.34 (0.325) |
| Absolute volume, gal./lb. | (0.1903) | (0.3694) |
| Particle size range, microns | 60-325 | <40->250 |

| | Microns |
|---|---|
| Screen analysis (U.S. mesh): | |
| Thru 30 on 60, 1% | >250, 3% |
| 60-100, 17% | 175-250, 3% |
| 100-170, 52% | 124-175, 12% |
| 170-230, 22% | 89-124, 15% |
| 230-325, 6% | 61- 89, 19% |
| Thru 325, 2% | 44- 61, 18% |
| | <44, 30% |
| Thermal conductivity B.t.u./hr./°F./ft.²/in. | 0.4 |
| Collapse point under hydrostatic pressure | 1,500-2,500 (<1,000) |
| Cost, U.S. dollars/ton | 400  1,200 |

¹ Ceramic.
² Sodium borosilicate glass.

In running laboratory tests of lightweight cement slurries containing hollow sealed spheres I have found that the spheres are fragile and easily broken during the mixing of the cement slurry. The effectiveness of the hollow sealed spheres as lightweight additives for the cement is thus lessened. Slurry densities were found to increase from 8.8 to 11.2 pounds per gallon for glass spheres and from 10.6 to 13.5 pounds per gallon for ceramic spheres when samples were stirred for 15 seconds at low speed and then 3 minutes and 35 seconds at high speed on a Waring blender.

In an effort to obtain a method of mixing the cement slurry with the hollow sealed spheres without breaking the spheres, I have discovered that the inclusion of anhydrous sodium metasilicate (ASMS) with the cement prior to the addition of water thereto enables a cement slurry to be mixed without significant breaking of the hollow sealed spheres. Anhydrous sodium metasilicate (ASMS) is available under the trade names Econolite, D-79, and Lodense from Halliburton Co., Dowell, and Byron Jackson, Inc., respectively. A cement slurry was mixed containing 200 grams of Trinity Class A cement, 6 grams of ASMS, 21 grams of glass hollow sealed spheres, and 458 grams of tap water. The glass hollow sealed spheres were blended into the dry cement and added to the water at low speed on a Waring blender in 15 seconds and then stirred at high speed for 35 seconds. The resulting cement slurry weighed 9.7 pounds per gallon. After stirring at high speed for 1 minute, the cement slurry weighed 9.8 pounds per gallon, and after stirring for 2 more minutes at high speed, the cement slurry weighed 10.0 pounds per gallon. The theory which is thought to explain the effectiveness of ASMS in mitigating the breakage of the hollow sealed spheres is twofold: (1) the ASMS forms a lubricating film over the hollow sealed spheres thus lessening breakage, and (2) the ASMS is an extender for cement and requires additional water to be added in the forming of a pumpable or workable cement slurry thus increasing the space between the suspended hollow sealed spheres and lessening their breaking by lessening their rubbing against one another.

Laboratory experimental work has been carried out using portland cement slurries containing hollow sealed spheres. The composition and properties of the tested cement slurries are included in Table II.

TABLE II.—PROPERTIES OF CEMENT SLURRIES CONTAINING HOLLOW SEALED SPHERES

| | Sample number | | | | | | | | | | | | |
|---|---|---|---|---|---|---|---|---|---|---|---|---|---|
| | 1 | 3 | 4A | 5 | 6 | 7 | 7A | 8 | 9 | 9A | 9B | 9C | 10 | 11 |
| Composition: | | | | | | | | | | | | | | |
| Cement (Class H), lb | 94.00 | 94.00 | | | | | | | | | | | | |
| Cement (Class A), lb | | | 94.00 | 94.00 | 94.00 | 94.00 | 94.00 | 94.00 | 94.00 | 94.00 | 94.00 | 94.00 | 94.00 | 94.00 |
| Glass microballoons IG-101, wt. percent on cement | 20.68 | | 10.34 | | | | | 10.34 | 20.68 | 20.68 | 20.68 | 20.68 | | |
| Eccospheres FA-A, wt. percent on cement | | | 40.14 | | 40.14 | 40.14 | 40.14 | | | | | | 60.20 | 60.20 |
| Anhydrous sodium metasilicate, wt. percent on cement | 0.0 | 0.0 | | 3.0 | 3.0 | 3.0 | 1.0 | 1.0 | 1.0 | 1.0 | 1.0 | 1.0 | 1.0 | |
| Water, wt. percent on cement | 126 | | 229 | 193 | 230 | 145 | 145 | 113 | 145 | 145 | 145 | 145 | 178 | 144 |
| 325 mesh silica, wt. percent on cement | | | 10.34 | | | | | | | | | | | |
| Properties: | | | | | | | | | | | | | | |
| Design slurry weight, lb./gal. | 9.3 | 10.6 | 9.7 | 11.1 | 9.5 | 9.9 | 9.9 | 10.6 | 8.9 | 8.9 | 8.9 | 8.9 | 9.2 | 9.3 |
| Slurry weight, lb./gal., after stirring: | | | | | | | | | | | | | | |
| 1. 15 sec. at low speed | 8.8 | 11.8 | | | | | | | | | | | | |
| 2. (1) plus 35 sec. at high speed | 9.6 | 12.4 | 9.7 | 11.0 | 9.5 | 10.2 | 10.2 | | 9.6 | 9.5 | 9.5 | 9.6 | 9.5 | 9.8 |
| 3. (2) plus 1 min. at high speed | 10.5 | 12.9 | 9.8 | | | | | | | 9.8 | | | | |
| 4. (3) plus 2 min. at high speed | 11.2 | 13.5 | 10.0 | | | | | | | 10.3 | | | | |
| Slurry yield, cu. ft./sk. | 3.33 | 2.48 | 4.43 | 3.47 | 4.93 | 3.64 | 3.64 | 2.67 | 3.90 | 3.90 | 3.90 | 3.90 | 4.61 | 4.09 |
| Compressive strength in 24 hrs. at 100° F., p.s.i. | 465 | 693 | 82 | 136 | 60 | 253 | | 569 | 279 | 318 | | | | |
| Density of set slurry after 24 hrs.: | | | | | | | | | | | | | | |
| At 1,000 p.s.i. and R.T. | | | | | | | | 10.4 | | | 10.2 | | | |
| At 3,000 p.s.i. and 110° F. | | | | | | | | | | | 11.5 | 10.5 | | 11.1 |
| Compressive strength in 24 hours., p.s.i.: | | | | | | | | | | | | | | |
| At 1,000 p.s.i. and R.T. | | | | | | | | 115 | | | 224 | | | |
| At 3,000 p.s.i. and 110° F. | | | | | | | | | | | 325 | 188 | | 435 |

The ability of the hollow sealed spheres to withstand mixing and placing was tested by preparing the slurries using standard API mixing procedures (15 seconds at low speed and 35 seconds at high speed on a Waring blender) and then weighing the slurries. Each slurry was then stirred at high speed 1 minute more and weighed and then stirred at high speed 2 minutes more and weighed.

The effect of agitation of cement slurries containing hollow sealed spheres but containing no ASMS is shown by samples 1 and 3, Table II, to be that significant breaking of the hollow sealed spheres results. This indicates that the hollow sealed spheres would be broken under the shear that they would be subjected to in normal field mixing of a cement slurry (the API code has established that 15 seconds at low speed plus 35 seconds at high speed on a Waring blender simulates field mixing of a cement slurry). Sample number 3 had a design density of 10.6 lb/gal. This density increased to 11.8 lb/gal after 15 seconds of low speed stirring, to 12.4 lb/gal after an additional 35 seconds of high speed stirring, to 12.9 lb/gal after an additional 1 minute of high speed stirring, and to 13.5 lb/gal after 2 minutes more of high speed stirring. The addition of 1-3 weight percent of ASMS and a corresponding increase of mixing water as required by the ASMS significantly reduced the breakage of the hollow sealed spheres as shown by Samples 4A and 7A with Samples 1 and 3, respectively, of Table II.

I have found that pumpable and workable cement slurries comprised of portland cement, anhydrous sodium metasilicate, water, and hollow sealed spheres made of ceramic or glass can be formed which have a density of less than 10 pounds per gallon. In forming such slurries the anhydrous sodium metasilicate should be mixed with the portland cement prior to the mixing of the cement with water. So mixing the anhydrous sodium metasilicate and cement enables the use of a greater amount of water in forming the pumpable and workable slurry than otherwise would be possible. Hollow sealed spheres made of ceramic or glass are included in the slurry as a lightweight additive. The hollow sealed spheres are desirably added to the dry portland cement to provide a convenient packaged cement mixture. The anhydrous sodium metasilicate is normally used in an amount no greater than 3 weight percent of the cement and preferably is used in an amount of 1–3 weight percent and more preferably is used in an amount within the range of 0.5 to 2.0 weight percent. The hollow sealed spheres are used in an amount of no greater than 70 weight percent of the cement. The preferred amount of ceramic spheres to use varies within the range of 40–60 weight percent of the cement and the preferred amount of glass spheres to use varies within the range of 10–20 weight percent of the cement. The ceramic spheres are preferred for use in oil well cement slurries because they are more resistant to crushing under hydrostatic pressure than are the glass spheres. The ceramic spheres may be used in cement slurries in wells wherein the hydrostatic pressure involved ranges upward to about 2,500 psi whereas the glass spheres should be used only where the hydrostatic pressure involved does not exceed about 1,000 psi.

In mixing slurries containing portland cement, ASMS, and hollow sealed spheres, sufficient water should be used to provide a pumpable or workable slurry. In general, this water requirement should be at least 5.0 gallons of water per 94 pounds of cement. The preferred amount of water to use in mixing slurries containing ceramic and glass spheres may be calculated by formulas (1) and (2) below, respectively:

amount of water (ceramic spheres) = 5.0 gallons of water per 94 pounds of cement + 1.82 gallons of water per each 10 weight percent of ceramic spheres + 4.2 gallons of water per each 1 weight percent of anhydrous sodium metasilicate. (1)

amount of water (glass spheres) = 5.0 gallons of water per 94 pounds of cement + 4.4 gallons of water per each 10 weight percent of glass spheres + 4.2 gallons of water per each 1 weight percent of anhydrous sodium metasilicate. (2)

The concrete which forms upon the setting of the cement slurry is useful among other things as a lightweight building material. This material has sufficient strength to serve as a lightweight building material and has good insulating qualities.

I claim:

1. In a process of treating a well penetrating the earth, the steps comprising:

a. forming a pumpable cement slurry comprising portland cement, anhydrous sodium metasilicate, hollow sealed spheres formed of material selected from the group consisting of ceramic and glass, and water;

b. introducing said cement slurry into said well; and c. allowing said cement slurry to set in said well.

2. The process of claim 1 wherein said anhydrous sodium metasilicate is present in an amount no greater than 3 qeight percent of said cement, said hollow sealed spheres are present in an amount no greater than 70 weight percent of said cement and of a size within the range of 10–325 microns in diameter, and water is present in an amount in excess of 5.0 gallons per 94 pounds of said cement.

3. The process of claim 2 wherein said hollow sealed spheres are formed of a ceramic material and said water which is present is determined in accordance with the following formula:

water present = 5.0 gallons of water per 94 pounds of cement + 1.82 gallons of water per each 10 weight percent of ceramic spheres + 4.2 gallons of water per each 1 weight percent of anhydrous sodium metasilicate.

4. The process of claim 3 wherein said ceramic hollow sealed spheres are present within the range of 40 to 60 weight percent and said anhydrous sodium metasilicate is present within the range of 0.5 to 2.0 weight percent.

5. The process of claim 2 wherein said hollow sealed spheres are formed of a glass material and said water which is present is determined in accordance with the following formula:

water present = 5.0 gallons of water per 94 pounds of cement + 4.4 gallons of water per each 10 weight percent of glass spheres + 4.2 gallons of water per each 1 weight percent of anhydrous sodium metasilicate.

6. The process of claim 5 wherein said glass hollow sealed spheres are present within the range of 10 to 20 weight percent and said anhydrous sodium metasilicate is present within the range of 0.5 to 2.0 weight percent.

* * * * *